F. E. PARKER.
COMBINED CLUTCH AND GOVERNOR.
APPLICATION FILED FEB. 4, 1909.
937,851.
Patented Oct. 26, 1909.
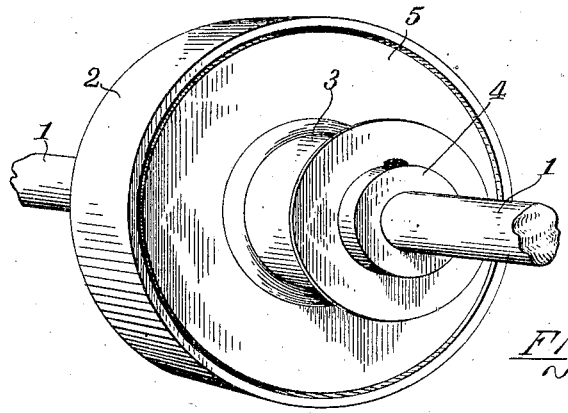
Fig. 1.
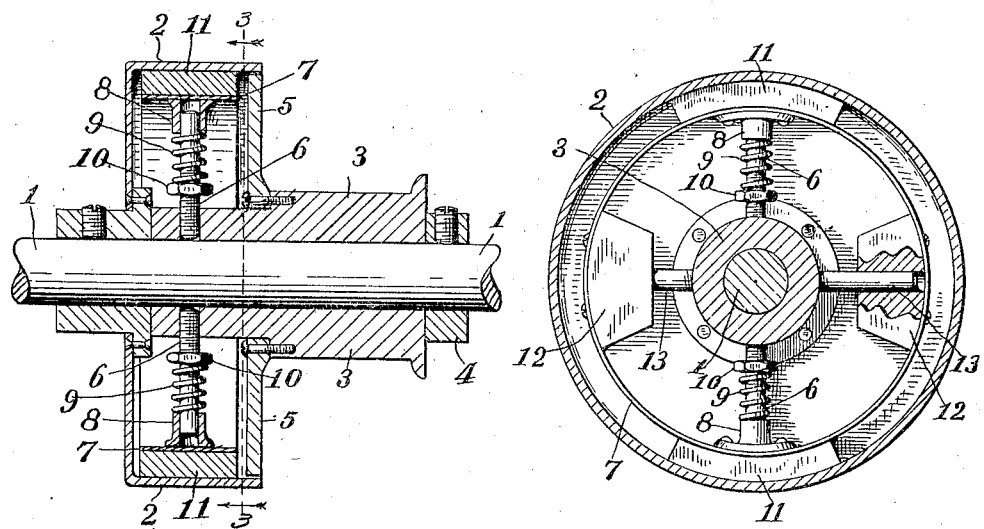
Fig. 2.
Fig. 3.
Witnesses
H. O. Van Antwerp
Georgiana Rhace
Inventor
Fred E. Parker
By Luther V. Moulton
Attorney

UNITED STATES PATENT OFFICE.

FRED E. PARKER, OF LANSING, MICHIGAN.

COMBINED CLUTCH AND GOVERNOR.

937,851.  Specification of Letters Patent.  Patented Oct. 26, 1909.

Application filed February 4, 1909. Serial No. 475,992.

*To all whom it may concern:*

Be it known that I, FRED E. PARKER, a citizen of the United States of America, residing at Lansing, in the county of Ingham and State of Michigan, have invented certain new and useful Improvements in Combined Clutches and Governors; and I do hereby declare the following to be a full, clear, and exact description of the invention, such as will enable others skilled in the art to which it appertains to make and use the same.

My invention relates to improvements in combined clutch and governor, and its object is to provide a device that will operate as a clutch under normal conditions of speed, and when running at a speed above the normal, will be thrown out of action as a clutch, and thus slip and limit the speed of the driven member, as will more fully appear by reference to the accompanying drawings, in which:

Figure 1 is a perspective of a device embodying my invention; Fig. 2 a longitudinal vertical section of the same; and, Fig. 3 a transverse section on the line 3—3 of Fig. 2.

Like numbers refer to like parts in all of the figures.

1 represents a shaft on which is fixed a cup shaped driving member 2.

3 is the driven member journaled on the shaft 1 and normally free to rotate thereon.

4 is a collar to hold the driven member from moving longitudinally of the shaft in one direction and the hub of the driver 2 engages and holds it from moving in the opposite direction.

5 is a flange or annular closure on the driven member 3 to close the opening in the cup shaped driver 2.

6 are two opposing radial arms fixed in the member 3 and within the driver 2. These arms carry radially movable sockets 8 at their outer ends and to these sockets are attached friction segments 11 engaging the inner surface of the driver 2. Surrounding the arms 6 are springs 9 engaging the sockets 8 at the outer end and engaging adjustable nuts 10 on the arms 9 at the inner end. These springs force the segments 11 into frictional contact with the driver 2 sufficient to transmit the required power without slipping, under ordinary conditions. The tension of the springs being adjusted by the nuts 10 for this purpose. To release the friction segments sufficient so that they will slip when the maximum speed has been reached, a flexible steel ring 7 is attached to the segments 11 and normally concentric with the axis of the shaft. Midway between the arms 6 in the same plane and at right angles thereto are other radial arms 13 inserted in the member 3 on which are mounted radially movable weights 12 engaging the interior of the ring 7 and slidable on the arms 13.

Whenever the speed reaches the maximum depending on the tension of the springs 9, the centrifugal force of the weights 12 will spring the ring outward at opposite sides and thus also inward against the tension of the springs 9, thus reducing the frictional contact of the segments with the member 2, which will permit the driver to slip on the segments and limit the speed of the driven member. This device also performs another desirable function in that any sudden over load on the device, which, if rigidly operative, would tend to breakage or damage of any machinery, will cause sufficient slipping of the driver on the segments to prevent such accidents.

I have called the member 2 the driver, but obviously it is immaterial whether the member 2 is the driver and the member 3 the driven member, or the reverse, the device operates the same either way.

It will be noted that the arms drive the segments and weights and confine the same to a direct radial movement and that the weights if not secured to the spring at all would operate as well and apply only an outward pressure or thrust on the spring and that the bending of the spring is not where perforated and thus risk of breakage or accident is greatly reduced.

What I claim is:—

1. A combined clutch and governor, comprising an outer cup shaped member, an inner member rotative therein, four equidistant radial arms fixed in the inner member, radially movable friction members and springs on two opposite arms, two radially movable weights on the other two arms, and means for connecting the weights and segments, whereby the weights move the segments inward and overcome the springs as the speed of the device increases.

2. A combined clutch and governor, comprising an outer cup shaped member, an inner member rotative within the same, four equidistant radial arms fixed in the inner member, radially movable sockets on two opposite arms, segments carried by said sockets and frictionally engaging the outer member, springs on said arms engaging the sockets at one end, nuts on the said arms adjustably engaging the other end of the springs, an integral flexible band extending between the segments and sockets, and weights radially movable on the other two arms and engaging the inner surface of the band.

3. A combined clutch and governor, comprising an outer cup shaped member, an inner member rotative therein, an integral flexible band between said members and normally concentric therewith, friction segments attached to the outside of the band and engaging the outer member, sockets opposite the segments, arms fixed in the inner member on which the sockets are slidable, weights engaging the inner side of the band intermediate the sockets, arms fixed in the inner member on which the weights are radially slidable, springs engaging the sockets, and means for adjusting the tension of the springs.

In testimony whereof I affix my signature in presence of two witnesses.

FRED E. PARKER.

Witnesses:
A. R. HARDY,
H. H. PULVER.